Sept. 1, 1931.    R. N. MILLER    1,821,661
LOCOMOTIVE SCALE
Filed Dec. 28, 1928    5 Sheets-Sheet 1
FIG. I.
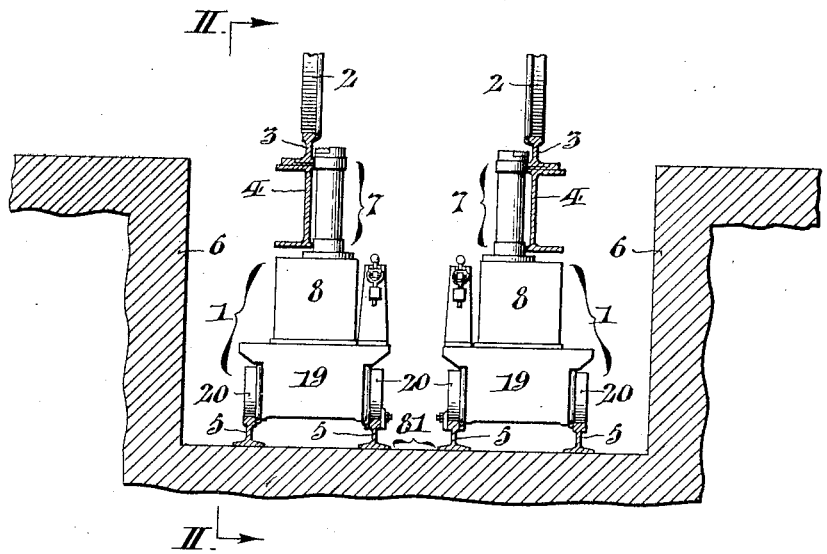
FIG. II.
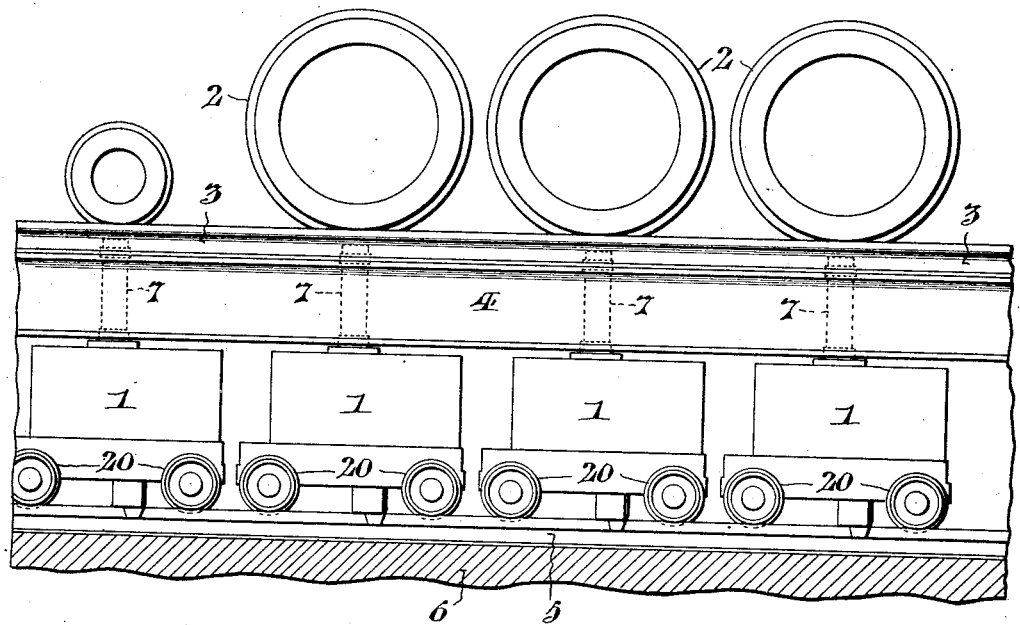
WITNESSES
INVENTOR:
Robert N. Miller,
BY
ATTORNEYS.

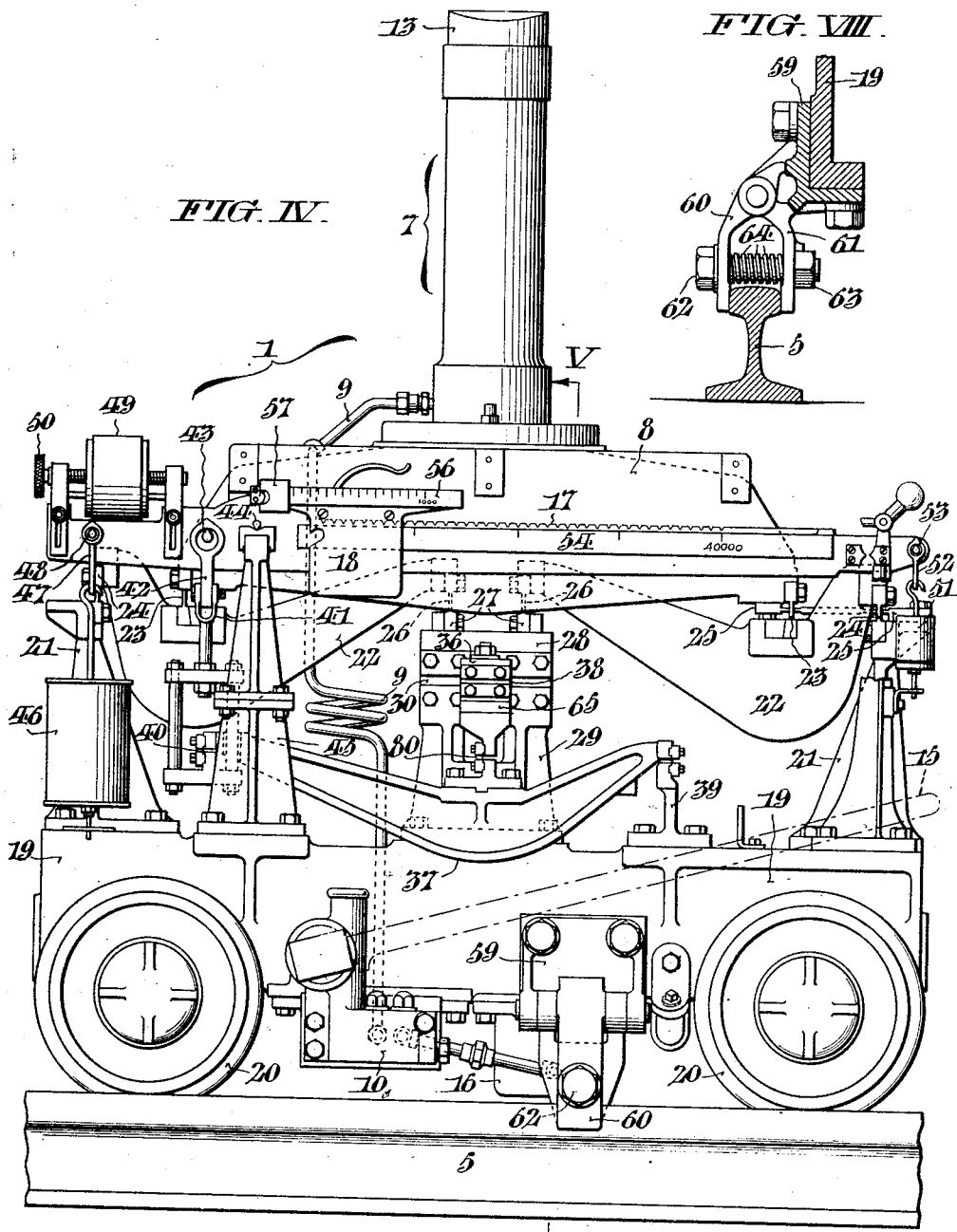

Sept. 1, 1931.  R. N. MILLER  1,821,661
LOCOMOTIVE SCALE
Filed Dec. 28, 1928   5 Sheets-Sheet 3
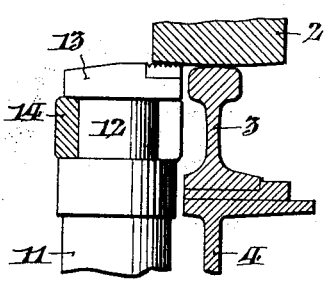
FIG. VII.
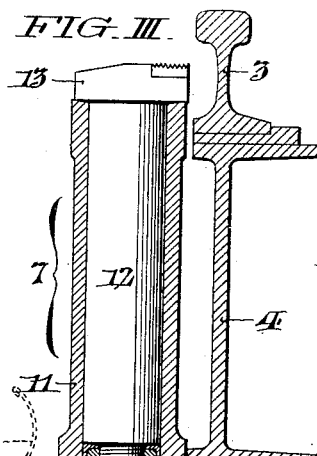
FIG. III.
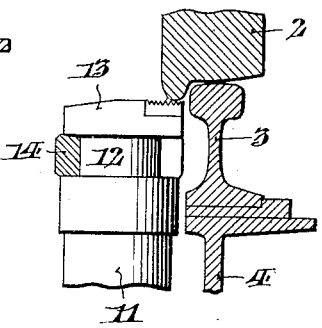
FIG. VI.
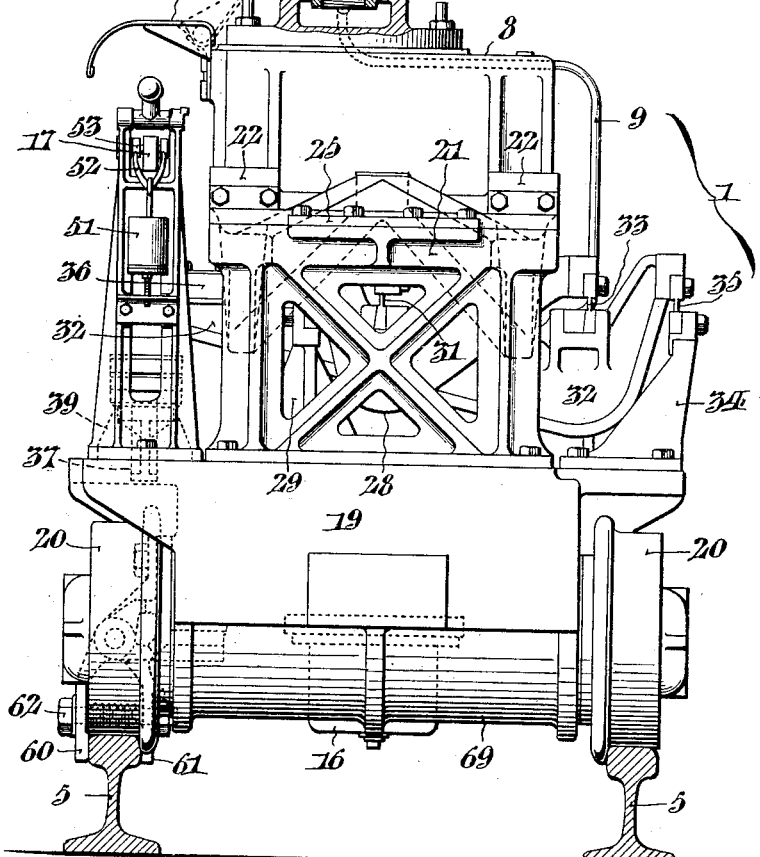
WITNESSES
Thomas W. Kerr Jr.
William Bell
INVENTOR:
Robert N. Miller,
BY Bakewell Paul
ATTORNEYS.

Sept. 1, 1931.  R. N. MILLER  1,821,661
LOCOMOTIVE SCALE
Filed Dec. 28, 1928  5 Sheets-Sheet 4
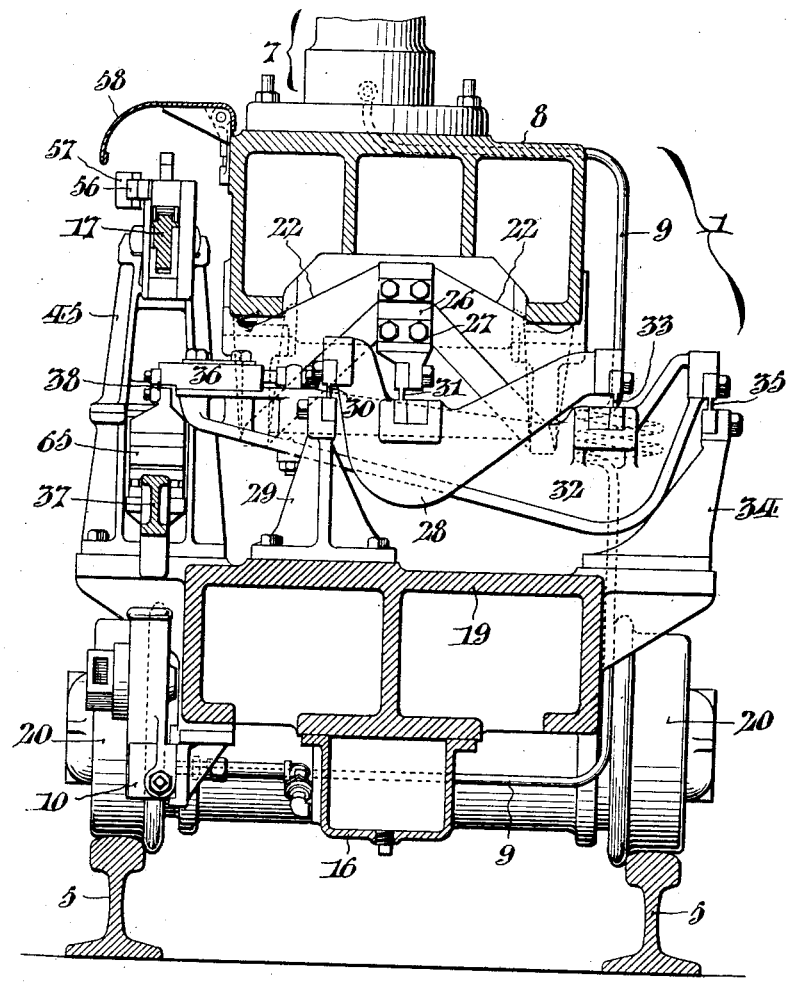
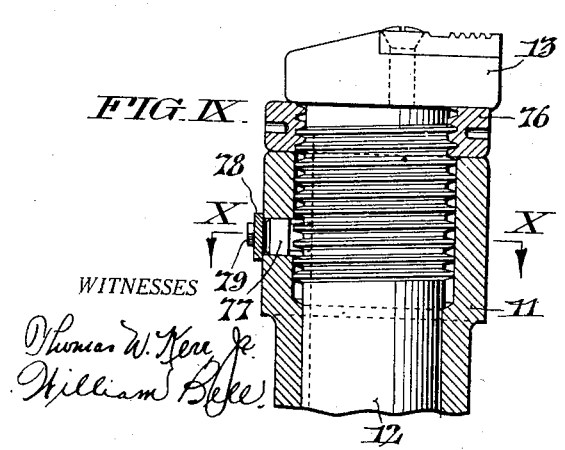
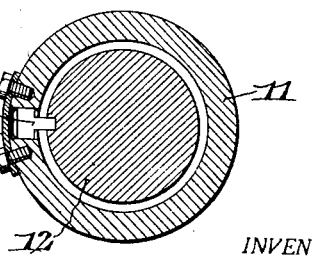
WITNESSES
INVENTOR:
Robert N. Miller,
BY
ATTORNEYS.

Sept. 1, 1931.  R. N. MILLER  1,821,661
LOCOMOTIVE SCALE
Filed Dec. 28, 1928  5 Sheets-Sheet 5
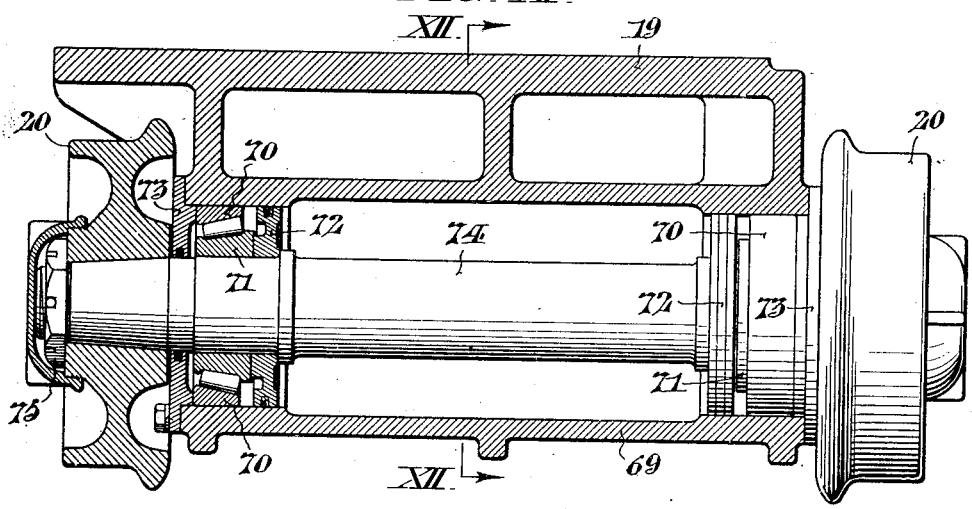
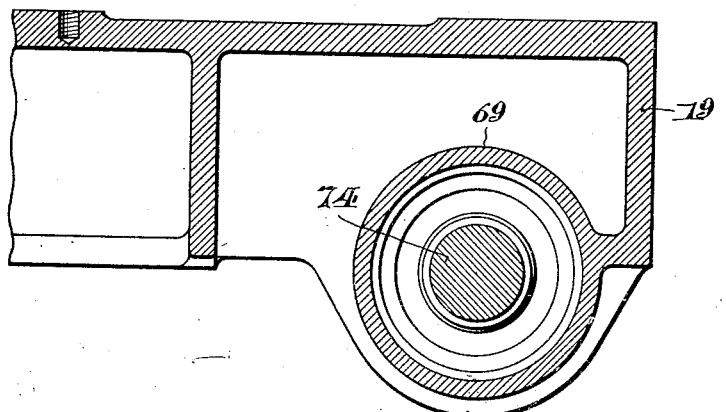
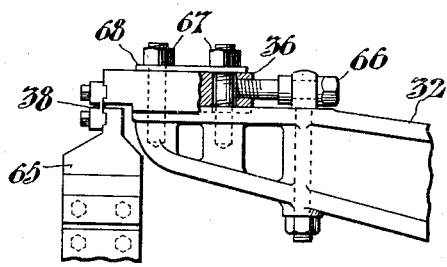
WITNESSES
INVENTOR:
Robert N. Miller,
BY
ATTORNEYS.

Patented Sept. 1, 1931

1,821,661

UNITED STATES PATENT OFFICE

ROBERT N. MILLER, OF ALTOONA, PENNSYLVANIA

LOCOMOTIVE SCALE

Application filed December 28, 1928. Serial No. 328,993.

My invention relates to scales for weighing locomotives. While applicable to scales for weighing other rolling equipment, the invention is, for the sake of brevity, described simply with respect to its application to the weighing of locomotives.

One object of my invention is the provision of novel means for ascertaining the load on each individual wheel of a locomotive under level track conditions.

Another object of my invention is to simulate inequalities of track and variations in spring deflection and to determine the resulting variations in the load on individual wheels and axles due to these conditions.

A further object of my invention is the provision of a combined scale and jack on a movable carriage to form a complete scale unit which is readily transportable from place to place.

With the increase in the weight of locomotives and the corresponding increase in axle and wheel loads, it has become more important to determine with accuracy the effect of variations in weight distribution by reason of non-symmetrical arrangement of equipment on the locomotive, not only with respect to axle loads and the longitudinal center of gravity but also with respect to individual wheel loads and the transverse center of gravity, in order that the maximum limits permissible for concentrated loads on bridges and other structures will not be exceeded or dangerously approached.

The means which I employ to ascertain this weight distribution consist primarily of a battery of individual scale units disposed on both sides of a stationary locomotive track, each unit being adapted upon the transfer of the load from the locomotive running rails to the scale unit, to weigh the load upon one of the wheels. The various advantages and novel features of the scale units, their mode of operation, and the manner in which they accomplish the objects sought to be attained will be apparent from the description of an embodiment of the invention which is described in connection with the accompanying drawings, whereof:

Fig. I is a transverse section of a weighing pit showing diagrammatically the position of a pair of scale units with respect to the wheels of one axle of a locomotive.

Fig. II is a longitudinal section of the weighing pit of Fig. I taken along the lines II—II thereof and showing diagrammatically the relative position of the scale units on one side of the locomotive track and the driving wheels of a locomotive.

Fig. III is an end elevation of a scale unit with its hydraulic jack shown in section.

Fig. IV is a front elevation of the same.

Fig. V is a vertical section of the same taken along the line V—V of Fig. IV.

Fig. VI is a detailed view showing the application of a jack of a scale unit to a flanged wheel of a locomotive.

Fig. VII is a detailed view showing the application of a jack to a locomotive wheel with flat tire.

Fig. VIII is a detailed view of a device for locking a scale unit to its supporting rail.

Fig. IX shows an alternate form of locking device for the jack plunger.

Fig. X is a cross-section of the same taken along the lines X—X of Fig. IX.

Fig. XI is an enlarged sectional view of a scale unit carriage.

Fig. XII is a cross-sectional view of the same taken along the lines XII—XII of Fig. XI; and, Fig. XIII is an enlarged detailed view of an adjustable nose iron hereinafter described.

With particular reference to Fig. I the apparatus there shown comprises a series of individual scale units, comprehensively designated by the numeral 1, disposed beneath the locomotive driving wheels diagrammatically represented at 2. The rails 3 of the locomotive track are stationary and are supported by the girders 4. Additional rails 5 located at the bottom of the weighing pit 6 form tracks upon which the scale units 1 are adapted to move longitudinally of the pit for disposition beneath the individual locomotive wheels 2 according to the wheel base arrangement of the locomotive to be weighed.

The scale units 1 shown in detail in Figs. III, IV and V include a hydraulic jack 7 rigidly secured to the load platen 8 of the scale with a flexible pressure line 9 leading from a manually operated pump 10 to the base of the jack 7. The jack 7 comprises a cylinder 11 with a plunger 12 operating within the cylinder and having on its upper end a plunger head 13 adapted to engage the tread of a locomotive wheel as shown in Figs. VI and VII. The pump 10 operated by means of a handle 15 is connected on its suction side with a tank 16 in which the hydraulic medium is stored.

To protect against accidental release of pressure on the jack plunger 12 or settlement of the jack during the weighing operation, locking means are provided between the plunger head 13 and the cylinder 11. This locking device may consist simply of a U-liner or shim 14 such as shown in Fig. VI. By the insertion of a liner 14 between the plunger head 13 and the cylinder 11, the extent of elevation of the jack may be determined with precision, and the hydraulic pressure may be released during the weighing operation.

The scale unit illustrated in the drawings includes a beam 17 of 40,000 pounds capacity of the direct reading type and a counterweight 51 of 10,000 pounds capacity making it possible to ascertain wheel loads up to 50,000 pounds. The scale is centrally mounted on a movable platform or a carriage 19 provided with flanged wheels 20 engaging with the supporting rails 5. On the carriage 19 are mounted two main lever stands 21 which support the main levers 22. These levers 22 are of delta form with fulcrums 23, 24, 26 of the plate fulcrum type, though knife edge fulcrums may, of course, be employed. The load platen 8 upon which the jack 7 is centrally mounted rests on the load fulcrums 23 of the main levers 22. To prevent endwise movement of the load platen 8, a flexure-type stay plate 25 is fastened to one end of the platen 8 and to the main lever stand 21. No check plate is provided at the opposite end of the platen 8 as the platen is constrained against lateral movement by virtue of the fulcrums 23.

The tip ends of the main levers 22 are connected by means of the machined fulcrums 26, the connecting blocks 27, and fulcrum 31, with the first extension lever 28 which in turn is supported at the heel by lever stand 29 and the fulcrum 30. In like manner the tip end of the first extension lever 28 is connected to a second extension lever 32 by a fulcrum 33, this lever being supported at the heel by a lever stand 34 and a fulcrum 35. An adjustable nose iron 36 shown in detail in Fig. XIII is provided at the tip of the second extension lever 32 for its connection with a shelf lever 37. A ribbon steel fulcrum 38 forms the connection between the nose iron 36 of the second extension lever 32 and a bearing block 65 which is connected with the shelf lever 37 by another fulcrum 80. To obtain the proper lever multiple of lever system up to and including second extension lever 32, an adjusting screw 66 is provided on the second extension lever 32. By turning the screw 66 the relative position of the nose iron 36 to the tip of the lever 32 may be varied. The nose iron when adjusted is firmly secured to the lever 32 by the tap bolts 67 and washer 68.

The shelf lever 37 in turn is supported at its heel by an additional lever stand 39. Its tip end is connected to the weighing beam 17 by a ribbon steel fulcrum 40, a yoke 41 and loop connector 42 engaging a knife edge 43 on the beam 17.

The weighing beam 17 is supported by a knife edge fulcrum 44 at the top of a weighing beam stand 45. On the short end of the weighing beam 17 a poise weight 46 is suspended by a loop connector 47 at the knife edge 48, and a balance weight 49 with an adjusting screw 50 is mounted above the beam. On the opposite end of the beam a counter-poise weight 51 sufficient to balance 10,000 pounds is suspended in a similar manner by a loop connector 52 at the knife edge 53. The beam 17 is provided with a graduated bar 54 notched at intervals of its length and in this instance reading to 40,000 pounds. A measuring weight 18 is adapted to move along the graduated bar 54 and to engage its notches. An additional graduated scale 56 reading to finer graduations up to 1,000 pounds is provided on the measuring weight 18 and carries an additional and smaller measuring weight 57. It will be seen that the additional scale 56 enables the recording of locomotive weights to within ten pounds and that the total capacity of the beam when the counterweight 51 is used is 50,000 pounds.

To prevent the weigh-beam 17 from becoming fouled due to cinders, dirt and the like, when not in use, there is provided a hinged hood 58 on the platen 8 extending outward over the weigh-beam. This hood 58 is adapted to be thrown back when the scale is in service to give ready access for operation of both poise and beam.

In order to prevent undesired movement of the scale unit on its supporting rails 5 during the weighing operations or at other times, a clamping device is mounted on the carriage frame 19. This device shown in detail in Fig. VIII is adapted to engage a rail 5 and consists of a casting 59 on the carriage 19 and movable jaws 60 and 61 pivoted on the casting 59 and adapted to grip the head of the rail 5, the jaws being clamped together by a screw 62 and nut 63. A spring 64 between the jaws 60, 61 assists their release from the rail when the nut 63 is loosened.

The construction of the carriage 19 is best illustrated in Figs. XI and XII. It comprises an integral casting with cylindrical axle housing 69. The housings 69 are adapted to accommodate roller bearings 70, 71 which are confined between disc members 72 and 73 on the carriage axles 74. A nut 75 retains the wheels 20 on their axles 74. It will be observed from the description thus far that the load of the jack 7 is centrally disposed on the carriage 19 and that the scale elements are compactly arranged thereon. By virtue of the arrangement described and the anti-friction roller bearings the scale units are well balanced and readily movable by hand on the rails 5.

An alternate form of locking device for the jack plunger is shown in Figs. IX and X. In the construction there shown the plunger 12 is threaded on its upper end, and the inside diameter of the cylinder 11 is enlarged adjacent the threaded portion of the plunger 12. A nut 76 engages the threads of the plunger 12 between the plunger head 13 and the top of the cylinder 11. When the jack is operated the nut 76 may be turned the desired amount so that after the locomotive wheel has been raised a predetermined distance above its running rail pressure can be released from the jack, and the elevated position of the wheel held by means of the nut 76 which has been run down against the cylinder 11. A key 77 held in the cylinder 11 by means of a plate 78 and bolts 79 prevents turning of the plunger 12 within the cylinder.

The operation of the individual scale units 1 to weigh individual wheel loads of locomotives will be apparent from their description thus far. By utilizing a battery of scale units with a row on each side of the locomotive pit track and a scale unit for each driving wheel it is possible to ascertain not only the loads on each such wheel and on each axle but also to ascertain the weight distribution longitudinally and transversely of the locomotive. The amount that each locomotive wheel 2 is to be raised above the running rail 3 of the track can be determined in advance by the size of the liner 14 selected, or by manipulation of the adjustable nut 76 in case the jack is equipped with the latter type of locking means. Separate regulation of the elevation of each jack can thus be effected to simulate track inequalities either longitudinally of the track or transversely thereof, and in like manner it is possible to simulate variations in spring deflection and to determine corresponding variations in weight distribution with respect to wheel or axle loads.

To permit the weighing pit to be used for purposes other than locomotive weighing, provision may be made for supporting a temporary pit platform between the girders 4 supporting the locomotive running rails 3. Such a platform would also furnish protection to the scale units when they are not being operated. With the arrangement shown a passageway 81 is provided between the rows of scale units on either side of the track center line, which passageway permits access of the weighing operator to the scales without the inconvenience of crawling in and out of the openings between locomotive wheels.

The scale units herein described and illustrated, while comparatively small and compact, are designed to effect a ratio between the pressure exerted on the load platen 8 and that exerted on the butt end of the weigh-beam 17 of 240:1, and are thus capable of use with the heaviest locomotives. They may be readily moved along the rails 5 by hand and their operation both with respect to the jacking of the locomotives and the recording of the load to be weighed may be carried out with ease. By reason of the construction and arrangement of scale equipment, no accessories other than the elements mounted on and forming a part thereof are necessary to their operation.

While I have described one embodiment of my invention in some detail, it will be apparent to those familiar with the art that changes may be made in the form of apparatus disclosed without departing from the spirit of the invention, and that certain elements or characteristics of the scale units herein described may at times be availed of to advantage with a corresponding use of the other elements or characteristics.

Having thus described my invention, I claim:

1. A scale unit for weighing railway vehicles comprising a carriage, a jack mounted on said carriage, said jack comprising a vertically disposed cylinder and a plunger guided therein having its upper end adapted to contact with a wheel of the vehicle to be weighed and to raise the same from its running rail, and means interposed between said jack and carriage for weighing the load so transferred.

2. A scale unit for weighing railway vehicles comprising a carriage, weighing mechanism on said carriage including a load platen, and a jack on said load platen, said jack comprising a cylinder and a plunger guided therein having its upper end adapted to contact with a wheel of the vehicle to be weighed and to raise the same from its running rail.

3. A scale unit for weighing railway vehicles comprising a carriage, weighing mechanism on said carriage, including a load platen, a jack on said load platen adapted to transfer the load on a wheel of the vehicle to be weighed from its running rail to said weighing mechanism, and a pump mounted on said carriage having a pressure line leading to said jack, said pump having on operating handle at the side of the carriage.

4. A scale unit for weighing railway vehicles comprising a carriage, weighing mechanism on said carriage including a load platen, a cylinder mounted centrally of said load platen with a portion of its wall directly beneath a wheel of the vehicle to be weighed, a plunger guided in said cylinder and having its upper end adapted to contact with a wheel of the vehicle to be weighed, and pressure means for operating said plunger whereby the load on said wheel may be transferred to the load platen aforesaid.

5. A scale unit for weighing railway vehicles comprising a carriage, weighing mechanism on said carriage including a load platen, a cylinder mounted centrally of said load platen with a portion of its wall directly beneath a wheel of the vehicle to be weighed, a pressure operated plunger guided in said cylinder and having its upper end adapted to contact with a wheel of the vehicle to be weighed and to raise the wheel from its running rail, and means for locking said plunger in a predetermined position of elevation whereby the load may be carried to the load platen through the cylinder aforesaid.

6. A scale unit for weighing railway vehicles comprising a carriage, weighing mechanism on said carriage, a jack mounted on said weighing mechanism, said jack comprising a vertically disposed cylinder, a pressure operated plunger guided therein and having its upper end adapted to contact with a wheel of the vehicle to be weighed and to raise the same from its running rail, means for locking said plunger to said cylinder in a predetermined position of elevation, and means for indicating the weight so transferred to the carriage.

7. A scale unit for weighing railway vehicles comprising a carriage, weighing mechanism on said carriage, a jack mounted on said weighing mechanism, said jack comprising a vertically disposed cylinder, a pressure operated plunger guided therein and having its upper end adapted to contact with a wheel of the vehicle to be weighed and to raise the same from its running rail, means interposed between the end of said plunger and the top of said cylinder whereby said plunger may be locked at the desired position of elevation, and means for indicating the weight so transferred to the carriage.

In testimony whereof, I have hereunto signed my name at Altoona, Penna., this 17th day of December 1928.

ROBERT N. MILLER.